Dec. 7, 1948.  P. M. SMITH  2,455,909
FOUL DETECTOR AND INDICATOR FOR BOWLING ALLEYS
Filed Dec. 3, 1941  2 Sheets-Sheet 1
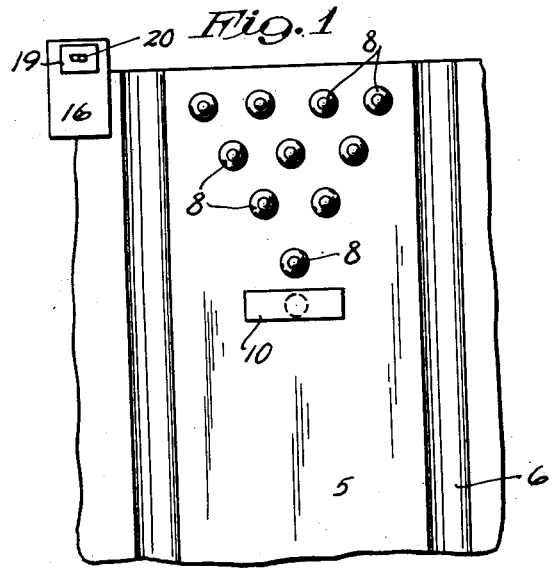
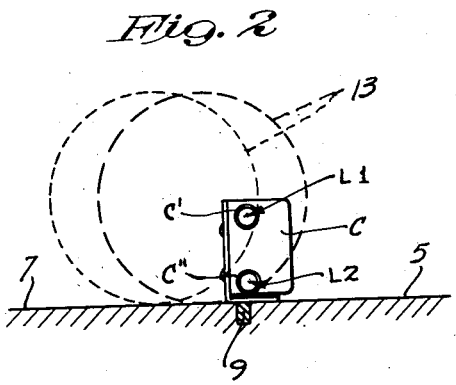
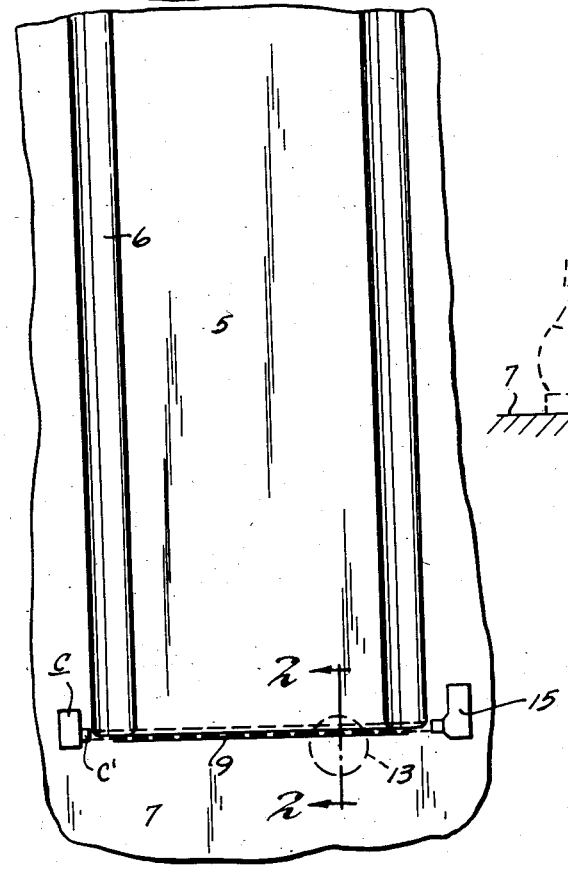
Inventor
Putnam M. Smith
By his Attorneys Dec. 7, 1948.  P. M. SMITH  2,455,909
FOUL DETECTOR AND INDICATOR FOR BOWLING ALLEYS
Filed Dec. 3, 1941  2 Sheets-Sheet 2

Inventor
Putnam M. Smith
By his Attorneys

Patented Dec. 7, 1948

2,455,909

UNITED STATES PATENT OFFICE 2,455,909

FOUL DETECTOR AND INDICATOR FOR BOWLING ALLEYS

Putnam M. Smith, Redwood Falls, Minn., assignor of one-half to A. Leslie Janes, Jr., Redwood Falls, Minn.

Application December 3, 1941, Serial No. 421,435

2 Claims. (Cl. 273—50)

My invention relates to an improved system and apparatus for automatically detecting and indicating fouls made by bowlers, a foul in the game of bowling being the crossing of the foul line between the approach to a bowling alley and the alley proper by a bowler's foot or any part thereof. In league bowling penalties are provided for players projecting any portion of their foot over the foul line and foul judges are usually provided for the purpose of detecting such fouls and indicating such to the interested players. Usually there is only one foul line judge for several parallel alleys in use at the same time so that the responsibility of the foul judge is quite great and the likelihood of his making an error, particularly by way of an oversight of a foul by one bowler when two or more bowlers foul at the same time, is ever present. In some cases the foul judge merely calls the fouls orally and in other cases each alley is provided with a suitable foul signal in the nature of a lamp, a bell, or both, under control of the foul line judge.

There has been a long recognized demand for a thoroughly dependable and accurate system for automatically detecting and signalling fouls as they occur on bowling alleys and while several attempts have hitherto been made to provide such automatic apparatus and while apparatus intended to accomplish these results has been commercially tried, these have largely been abandoned or greatly restricted in use usually because the automatic apparatus would fail, under some conditions, to call a foul when it was made, and would fail under other conditions to distinguish between a ball crossing the foul line and a bowler's foot and would thereby indicate a foul when no foul was actually made.

An object of the present invention is, therefore, the provision of a greatly improved foul detecting and indicating system which will largely overcome the above noted and other objections to previous systems of this kind and will provide an accurate apparatus for detecting and indicating such fouls by signal.

The present invention employs means for projecting rays over and parallel to the foul line of the bowling alley at a level to be intercepted by a bowling ball or a bowler's foot crossing the foul line together with light ray responsive foul detecting signal control apparatus for detecting interception of the projected rays and operating the foul signal. To this extent the apparatus of the present invention is similar to certain prior art apparatus but, very broadly stated, it may be said that the apparatus of the present invention is distinguished from prior art apparatus of the light ray responsive type by the incorporation therein of a plurality of light ray responsive devices jointly controlling the operation of the foul signal and arranged so that the light rays thereto will be intercepted successively and in one predetermined order by the bowling ball rolled over the foul line and in a different order of progression or singularly by a bowler's foot crossing the foul line; whereas, the general practice in the prior art has been to employ a single light ray responsive control device. With the multiple light ray responsive control devices of the present invention the matter of distinguishing between the bowling ball rolled over the foul line and a bowler's foot projected over the foul line is very simply and positively accomplished by employing certain of the light ray responsive control devices for the purpose of rendering the other of such light ray responsive control devices ineffective for the purpose of operating the foul signal under certain predetermined conditions of progressive interruption of the light rays to the different light sensitive control devices. By experience in actual use of the device in commercial bowling alleys, I found that fouls are called with a much higher degree of accuracy than was the case in prior art devices employing only a single light ray responsive control device and in which, according to customary practice, distinction between a ball rolled over the foul line and a bowler's foot projected over the foul line was usually made on the basis of a calculated difference in the time intervals that the light rays to the control device would be intercepted by a bowling ball on one hand and a bowler's foot on the other, it having been assumed that the bowling ball would pass over the foul line more rapidly than a bowler's foot.

The above and numerous other important objects, advantages and structural features will be made apparent from the following specification, claims and appended drawings.

In the accompanying drawings wherein like characters indicate like parts throughout the several views:

Fig. 1 is a plan view with some parts broken away of a conventional bowling alley equipped with a foul detecting and indicating system of the present invention;

Fig. 2 is an enlarged fragmentary sectional view taken on the line 2—2 of Fig. 1 and illustrating two positions of a bowling ball rolling over the foul line and through the light ray beams to two light ray responsive foul detecting and indicator control devices of the present system;

Figure 4:
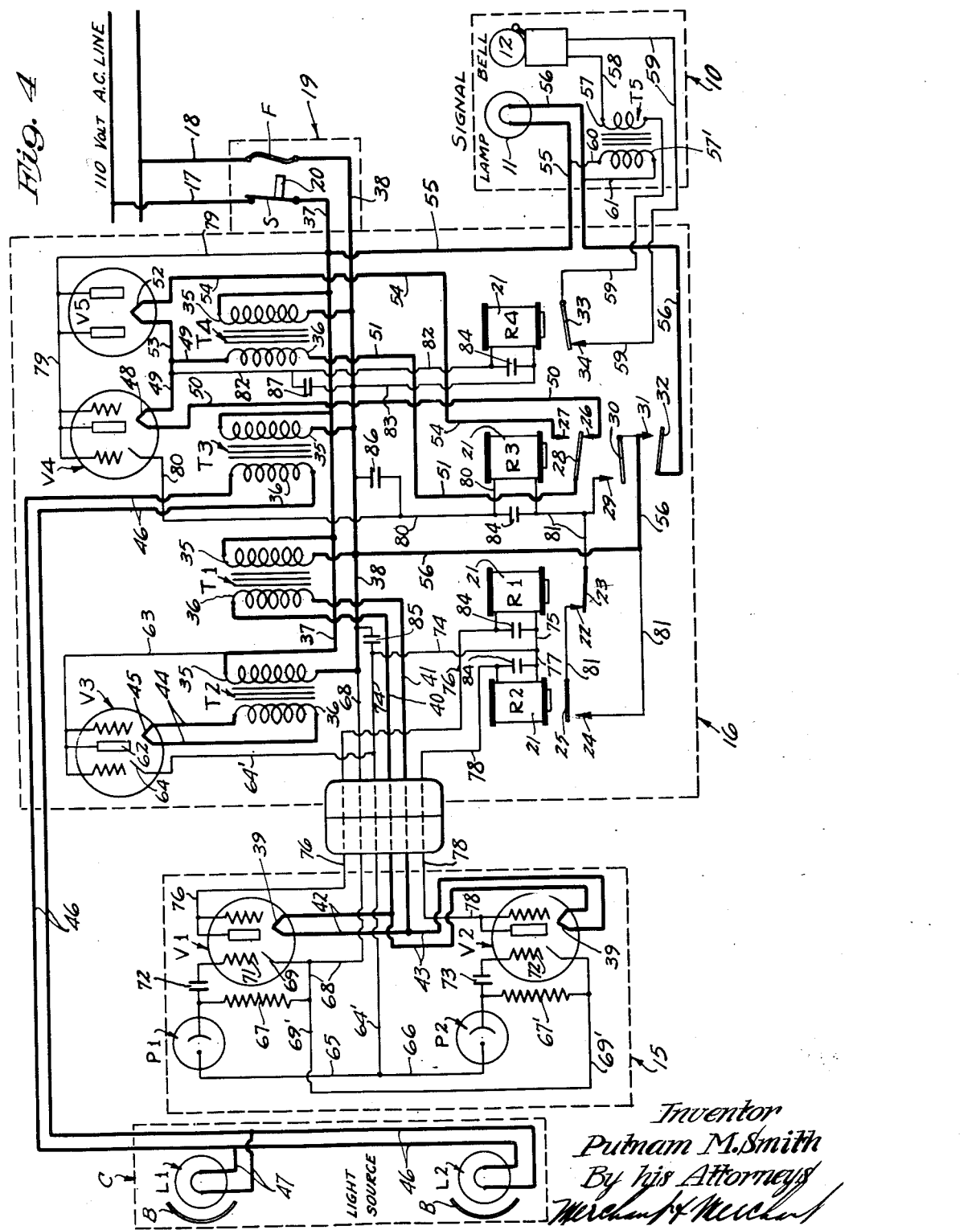

Fig. 3 is a view similar to Fig. 2 but illustrating a bowler's forefoot projected over the foul line and in position to intercept light rays to the lower of the two light ray responsive foul detector and indicator control devices of the circuit; and Fig. 4 is a diagrammatic view illustrating a preferred electrical hook-up and the various component parts making up the preferred embodiment of the invention herein illustrated.

With reference first to Figs. 1, 2 and 3, the conventional bowling alley is indicated by 5, the parallel gutters at opposite sides of the alley are indicated by 6, the approach to the alley 5 by 7 and the bowling pins by 8. In these figures also the foul line marker between the run-way or approach 7 and alley 5, is indicated by 9.

The foul signal apparatus proper of the present invention preferably includes both visual and audible signalling devices contained within a common signal housing or casing 10 preferably located near the rear of the alley and suitably suspended above the same. The visual signal device is shown as being in the nature of an incandescent lamp 11 and the audible signal device illustrated is in the nature of a bell 12 of the conventional electromagnetic type.

In the preferred embodiment of the invention herein illustrated two light beam projecting devices are employed and each of these includes an incandescent lamp and a reflector B. These light beam producing devices are preferably located in a common light source casing C, one above the other and arranged to project light beams in parallel relation. The incandescent lamp of the upper light beam projector is indicated by L1, and the incandescent lamp of the lower light beam projector is indicated by L2. The light source casing C is provided with a light aperture C', opposite the lamp L1 and with a light aperture C" opposite the incandescent lamp L2 and is located at one side of the alley with its apertures C' and C" directed to project light rays longitudinally over the foul line marker 9. The narrow beam of light projected from lamp L1 will be projected longitudinally of the foul line and in parallel spaced relation thereto in a horizontal plane relatively close to the horizontal plane containing the diameter of a bowling ball, and the beam of light projected from lamp L2 will be directed longitudinally of the foul line in spaced parallel relation thereto and at a horizontal level very close to the foul line and well below the plane of the diameter of a bowling ball rolled over the foul line. By reference particularly to Fig. 2 it will be seen that the light apertures C' and C" for the lamps L1 and L2 respectively are located in the same vertical plane and, due to the described arrangement thereof, one in respect to the other, and to the diameter of a bowling ball indicated by 13, a bowling ball 13 rolled over the foul line will successively interrupt the light beams from L1 and L2. On the other hand, by particular reference to Fig. 3, it will be seen that when a bowler's foot 14 slides across the foul line, the forefoot interrupts the beam from L2 first and, if projected still further, may also break the beam from L1, but in this case, the order in which the beams from L1 and L2 will be broken, will be reversed with respect to the order of progression when a bowling ball is rolled over the foul line.

Located in directly opposed relation to the light source casing C and at the opposite end portion of the foul line is a detector unit casing 15 containing two light ray responsive or activated foul detector and signal control devices in the nature of photo-electric cells P1 and P2. Also located in this casing 15 are amplifying vacuum tubes V1 and V2. The photo-electric cells P1 and P2 are each mounted back of a suitable light aperture in the housing or casing 15 and are arranged, the former coaxial with the beam of light rays from lamp L1 and the latter coaxial with the light beam projected from L2.

The elements P1 and P2, and V1 and V2, contained within the casing 15, form part of the signal control apparatus, the other elements of which are largely contained within a casing or housing 16 which, in turn, is preferably located near the rear of the alleys. A plurality of lead wires extend between the casings 15 and 16 and are intermediately coupled together by a coupling of the multiple prong and socket type.

The entire apparatus hereof is powered from a conventional alternating current power line consisting of leads 17 and 18 and which, for the purpose of this case, may be assumed to carry 110 volts. The power line leads 17 and 18 enter a combination switch and fuse box 19 mounted on the casing 16 and are connected, the former to one side of a master control switch S and the latter to one side of a fuse F. The switch S has a control element 20 that projects through the box 19 and is conveniently operated by the pin setter.

Contained within the casing 16 are electromagnetically operated relays R1, R2, R3 and R4, electronic vacuum tubes V3, V4 and V5 and transformers T1, T2, T3 and T4. The relays R1 to R4 inclusive each include a solenoid coil 21 and one or more switches immediately to be described. Relay R1 further includes a single pole, single-throw switch comprising contacts 22 and 23, and relay R2 further includes a single pole, single-throw switch comprising contacts 24 and 25. Relay R3 further includes a single pole, double-throw switch comprising contacts 26, 27 and 28, a single throw switch comprising contacts 29 and 30 and a single pole switch comprising contacts 31 and 32. Relay R4 further includes a single pole, single throw switch comprising contacts 33 and 34. The transformers T1 to T4, inclusive, are of the step-down variety and each comprise a primary winding 35 and a low voltage secondary winding 36. The primaries 35 of the transformers T1 to T4, inclusive, are all connected in parallel to the power line through the switch S and fuse F by leads 37 and 38. Transformer T1 has its low-voltage secondary 36 connected in parallel to the heaters or filaments 39 of vacuum tubes V1 and V2, by leads 40 and 41, a pair of branch leads 42, and another pair of branch leads 43. The secondary winding 36 of transformer T2 is connected by leads 44 to the filament 45 of vacuum tube V3. The secondary 36 of transformer T3 is connected to the opposite sides of the filaments of lamps L1 and L2 by a pair of leads 46 connecting directly to the filament of L2 and a pair of branch leads 47 connecting the filament of L1 in parallel with the filament of L2. Transformer T4 supplies filament current to tubes V4 and V5. The circuit for the filament 48 of V4 comprises a lead 49 extending from one side of the secondary 36 of transformer T4 to one side of the filament 48 of V4, a lead 50 connecting the other side of the filament 48 of V4 to contact 26 of relay R3, contact 28 of R3, and a lead 51 from contact 28 of R3 back to the secondary 36 of transformer T4.

The circuit of the filament 52 of tube V5 comprises part of lead 49 from one side of the secondary 56 of transformer T4, a short lead 53 to one side of filament 52, a lead 54 from the other side of the filament 52 to contact 27 of relay R3, the switch contact 28 and the lead 51 which returns to the secondary 56 of T4.

The filament of the signal lamp 11 is operated at line voltage and is connected to the leads 37 and 38 by a circuit comprising a lead 55 extending to the filament from the lead 37 and a lead 56 having interposed therein contacts 32 and 31 of relay R3 and extending to power line lead 38. The signal bell 12 is operated from the low-voltage secondary winding 57 of a transformer T5, located in the signal housing 10, by a circuit comprising a lead 58 and a lead 59 having interposed therein the contacts 34 and 33 of relay R4. The primary winding 57' of the transformer T5 is connected in parallel with the filament of the signal lamp 11 by leads 60 and 61.

The photo-electric cells P1 and P2 are supplied with pulsating direct current from the alternating current power leads 37 and 38 through the medium of V3 which has its plate 62 and two grids tied together to serve as a common anode and which anode is connected to the high voltage alternating current lead 37 by a lead 63. The cathode 64 of V3 is connected to the in-put of P1 and P2 by a lead 64' and branch leads 65 and 66. The out-put side of the photo-electric cell P1 is connected to the A. C. line lead 38 by a load resistor 67 and a lead 68 to which lead the cathode 69 of V1 is also connected. The out-put side of the photo-electric cell P2 is similarly connected to lead 38 by a load resistor 67', a lead 69' to which the cathode of V2 is also connected, and lead 68. Thus it will be seen that the photo-electric cells P1 and P2 are connected in parallel to a pulsating direct current circuit including rectifier V3. With this arrangement, pulsating direct current at relatively high voltage will flow in the circuit of P1 so long as P1 is activated by light rays or waves from lamp L1 but will cease or substantially cease flowing when the light ray or wave beam to cell P1 is interrupted, and pulsating current at relatively high voltage will flow in the circuit of cell P2 is activated by light rays or waves from lamp so long as cell P2 is activated by light rays or waves from lamp L2 but will substantially cease flowing when the light ray or wave beam to P2 is interrupted. Such interruption of the light ray beam to cell P1 and consequent modified current flow through the circuit of P1 will produce a variation in the voltage drop across resistor 67, which voltage variation will be impressed upon the grid 71 of V1 through a suitable condenser 72, and the interruption of the light beam to P2 will cause a similar current variation in the circuit of P2 which will cause a similar voltage drop across resistor 67' which will be impressed upon the grid 72 of V2 through a suitable condenser 73. The voltage variations thus applied to the grid of V1 will be amplified and applied to actuate relay R1 and the grid voltage variation thus applied to vacuum tube V2 will be amplified and used to actuate relay R2.

It will be seen that the plate and an extra grid of tube V1 are connected together to form a common anode and are supplied with high voltage pulsating direct current from the rectifier V3 through part of lead 64', a lead 74, a lead 75, the coil of relay R1 and a lead 76. This high voltage circuit for the coil of relay R1 will be completed through the vacuum tube V1, cathode 69 thereof, and lead 68 returning to the high voltage supply line lead 38. The plate and extra grid of tube V2 are connected together to form a common anode and are connected to the out-put or cathode side of the rectifier tube V3 through part of lead 64', lead 74, a lead 77, coil 21 of relay R2, and a lead 78. By reference to Fig. 4 it will be seen that this last described high voltage circuit for R2 is completed from the out-put or cathode side of V2 through lead 69' and lead 68 to lead 38 of the power line.

Vacuum tube V4 serves merely as a rectifier for furnishing intermittent direct current to the coil 21 of relay R3 and has its two grids and its plate connected together to form a common anode and these are connected to high voltage lead 37 through a lead 79, and its out-put or cathode side is connected to one side of the coil of relay R3 by lead 80. The other side of the coil of relay R3 is connected to power lead 38 by a lead 81 having interposed therein contacts 23 and 22 of relay R1 and contacts 25 and 24 of relay R2, and the vertical part of lead 56. The switches of relays R1 and R2 are therefore connected in series in the circuit of the coil of relay R3. Connected in shunt with the switches of relays R1 and R2 are the switch contacts 29 and 30 of relay R3 and when these last named switch contacts 29 and 30 are closed, a shunt holding circuit for the coil of relay R3 is established independently of the switches of relays R1 and R2.

Vacuum tube V5 has two plates connected together and serves as a source of rectified current for the coil 21 of relay R4. The connected plates of V5 are connected to the power lead 37 in parallel with the plate of V4 through lead 79. The filament 52 of rectifier tube V5 is connected to one side of the coil 21 of relay R4 through lead 53, part of lead 49, and a lead 82. The other side of the coil 21 of relay R4 is connected to the lead 38 of the power line by a lead 83.

In accordance with the preferred embodiment of the invention illustrated, suitable condensers 84 are connected one across each of the relay coils 21 and condensers 85, 86 and 87 are preferably connected in the electrical positions illustrated.

*Operation*

To render the foul detecting and signal control mechanism operative, it is merely necessary to manually close the master control switch S and normally this switch will be closed and left closed during the entire period that the equipped alley is in use.

Upon closing of the manual control switch S, the photo-electric cells P1 and P2 will become activated by light rays or waves from L1 and L2 respectively, so that the grids of V1 and V2 will be swung in a positive direction with the result that sufficient current will flow in the plate circuits of V1 and V2 to energize the coils 21 of relays R1 and R2, with the result that switch contacts 22 and 23 of relay R1 will be closed and contacts 24 and 25 of relay R2 will be opened, see Fig. 4. Now it will be apparent that, since the coil 21 of relay R3 can only be energized by coincidental closing of the switches of relays R1 and R2, the said coil of relay R3 will remain de-energized during normal periods of operation, and the various switch contacts thereof will remain in the position shown in the diagram Fig. 4 until the switches of relays R1 and R2 are coincidentally closed. By reference to Fig. 4 it will further be seen that in a normal condition of the apparatus the high voltage operating circuits for the signal lamp 11 and bell 12 are inoperative by virtue of open contacts 31 and 32 of relay R3 which are interposed in lead 56. Also by reference to Fig. 4 it will be seen that the secondary circuit of the transformer T5, supplying the low voltage to the signal bell, is closed through contacts 33 and 34 of relay R4 by virtue of the fact that contacts 27 and 28 in the filament circuit of vacuum tube V5 are open so that there is no high voltage available through V5 to supply or energize the coil 21 of relay R4 during normal operating periods of the device or apparatus.

When a bowling ball 13 is rolled through the foul line, the activating light wave beams to photo-cells P1 and P2 will be successively interrupted in the order named. That is to say that the light beam to P1, being the closest to the plane of the diameter of the ball 13, will be interrupted first, and that the light beam to P2, being lower and further from the plane of the diameter of the ball, will be interrupted secondly. Hence, when cell P1 becomes de-activated by interruption of its activating light beam, the grid 71 of V1 will swing negative and substantially stop the current flow through the plate circuit of V1 and the coil 21 of relay R1 with the result that coil 21 of relay R1 will immediately be de-energized and will permit opening of switch contacts 22 and 23 thereof; and upon de-activation of cell P2 by interruption of the light beam thereto, the grid 72 of V2 will swing negative and substantially stop the current flow through the plate circuit of V2 and the coil 21 of the relay R2 with the result that coil 21 of relay R2 will become de-energized and permit closing of contacts 24 and 25. Since this closing of contacts 24 and 25 occurs, under the conditions described, subsequent to the opening of contacts 20 and 22 and while the ball is still interrupting the light beam to P1, no closing of the circuit through coil 21 of R3 will result and no signal will be produced. Of course, the contacts of relays R1 and R2 will remain, the former in an open position and the latter in a closed position during the interval that the beams to both P1 and P2 are being intercepted by the ball, but the rolling ball will move out of the path of light rays or waves to cell P2 first, thereby causing opening of contacts 24 and 25 of relay R2, and will then roll out of the path of the beam of light rays to cell P1, thereby permitting subsequent closing of the contacts 22 and 23 of R1. Obviously this returning of the switches of relays R1 and R2 to their normal positions in the order specified, under passage of a ball over the foul line, will not result in energization of the coil 21 of relay R3 and, hence, will not produce any signal for the reason that the switch contacts 24 and 25 of relay R2 are opened prior to the re-closing of switch contacts 22 and 23 of relay R1. Hence, it will be seen that the rolling of a ball over the foul line and through the light beams to photo-electric cells P1 and P2 will not and cannot result in a signal by either lamp or bell and this irrespective of the speed of the ball as it rolls through the light beams.

Now by particular reference to Fig. 3 it will be noted that when a bowler fouls by sliding his foot over the foul line, either one of two things will happen, to wit, in some instances the bowler's forefoot will intercept the light beam from L2 to P2 and stop there without ever intercepting the beam to cell P1; while in other instances, the bowler's forefoot may first interrupt the beam to cell P2 and then continue forward and subsequently break the beam to cell P1 which will, of course, be breaking the beams in the reverse order with respect to the order in which the beams are broken when a ball passes through. In either instance, however, the breaking of the beam to cell P2 and consequent de-activation of cell P2 while P1 is in an activated condition, will result in the de-energization of the coil 21 of relay R2 and the closing of the contacts 24 and 25 of relay R2 which, in turn, results in energization of the coil 21 of relay R3 and the moving of switch contacts 28, 30 and 32 of relay R3 to their upper signal operating positions with the following results, to wit: (a) the closing of contacts 29 and 30 and consequent completion of the circuit through the coil 21 of relay R3 independently of the switch contacts of relays R1 and R2, so that the passing of a bowler's foot out of the light beam to either or both of the photo-cells P1 and P2 has no effect; (b) the closing of the switch contacts 31 and 32 of relay R3, completing the high voltage operating circuits of the signal lamp and bell, thereby setting both thereof in operation simultaneously, the bell 12 operating by virtue of the further fact that contacts 33 and 34 of relay R4 are closed during this time and pending the energization of the coil of relay R4; (c) the closing of switch contact 28 of relay R3 with the contact 27 thereof closing the normally open filament circuit of V5 which is a fast heating type of tube and heats up and becomes operative after about five seconds with the result that operating current flows therethrough and through the coil 21 of relay R4 and causes opening of the switch contacts 33 and 34 of relay R4 and cuts the signal bell out of operation after approximately five seconds of operation; (d) the opening of contacts 26 and 28 of relay R3 at the very start of the signaling period breaking the filament circuit of vacuum tube V4 which tube is of relatively very slow heating and cooling type and will continue to pass sufficient current through the same and the coil 21 of relay R3 to keep relay R3 operatively energized for a period of approximately twelve seconds, at which time the tube V4 will have cooled sufficiently to cause de-energization of the coil of relay R3 and permit the contacts 28, 30 and 32 thereof to return to their normal positions, shown by full lines in Fig. 4, thereby terminating the signal period, the lamp signaling period being terminated by opening of contacts 31 and 32 of relay R3.

Another very important feature of the invention is the fact that the cooling of the filament of V4 and the consequent de-energization of the coil of relay R3, results in a complete re-setting of all of the switches to their normal positions so that the apparatus is automatically and immediately re-set and placed in condition to detect and indicate another foul as soon as one occurs.

In a sense the detecting and control apparatus described is a double or duplex system involving cooperating primary and secondary detecting and control apparatus, although numerous elements of the system are common both to the primary and secondary apparatus. In this connection elements L1, P1, V1, R1 and contacts 22 and 23 of R1 may be said to form the primary apparatus when completed by the cooperating elements to the right thereof in Fig. 4, and elements L2, P2, V2, R2 and contacts 24 and 25 of R2 and all cooperating parts to the right of R1 in Fig. 4 may be said to constitute the secondary apparatus. Of course, elements V3 and T1 are also common to the so-called primary and secondary apparatus. With the system thus divided into primary and secondary apparatus, it may be said that the primary apparatus is responsive to activation of its light ray responsive device P1 to initiate signal operation dependent upon a signal operative condition of the secondary apparatus and is responsive to de-activation of P1 to render the secondary apparatus incapable of initiating operation of the signal; and that the secondary apparatus is responsive to activation of its light ray responsive detector P2 by light waves to render the primary control apparatus incapable of initiating operation of the signal and is responsive to interruption of projected light waves to its detector and control device P2 to initiate operation of the foul indicator dependent upon an indicator operative condition of the primary control apparatus.

Although the apparatus of the invention as presently constructed employs lamps L1 and L2 of the type that produce light waves within the visible spectrum and employs photo-electric cells P1 and P2 of the type that are responsive to waves or rays within the visible spectrum, the use of waves outside of the visible spectrum has been contemplated and the terms "light waves" and "light rays" have been used in a broad and liberal sense to cover and embrace devices producing or sensitive to light type waves either within or beyond the visible spectrum.

What I claim is:

1. In a foul detecting and indicating system for bowling alleys, a normally inoperative foul signaling device, an operating circuit for the signaling device which includes a normally open switch, electro-magnetically operated means for operating the signal circuit switch, a circuit for said electro-magnetically operated signal circuit switch operating means and which, circuit, includes a serially connected pair of switches, one of said pair of switches being normally open and the other of which is normally closed, another circuit for said electro-magnetically operated signal switch operator and which includes a normally open switch under control of the said electro-magnetically operated switch operator and excludes said pair of switches, whereby to provide a holding circuit for maintaining the said electro-magnetic signal switch operator energized independently of said pair of switches after initial energization by coincidental closing of said pair of switches, separate electro-magnetically operated devices for independently operating the last said switches, light wave responsive control devices for independently controlling operation of said last named electro-magnetic switch operators, and means for projecting light waves from side to side of a bowling alley above and parallel to the foul line thereof and below the top of a bowling ball rolled over the foul line, said light wave responsive control devices each being subject to projected light waves that will be intercepted by a bowling ball rolled over the foul line.

2. The structure defined in claim 1 which further comprises a thermo-electronic tube connected serially in the holding circuit for the electro-magnetic signal switch operator and which thermo-electronic tube includes a heating filament, and a normally closed circuit for said filament involving a normally closed electro-magnetically opened switch under control of the signal circuit control switch operator, whereby coincidentally with the starting of operation of the signal the filament circuit of said thermo-electronic tube will be opened and said tube will begin to cool and will open the said holding circuit for the electro-magnetic signal switch operator after a pre-determined period of operation and the entire apparatus will be reset to its normal condition preparatory to detection and indication of another foul.

PUTNAM M. SMITH.

REFERENCES CITED

The following references are of record in the file of this patent:

UNITED STATES PATENTS

| Number | Name | Date |
| --- | --- | --- |
| 2,037,671 | Yannes | Apr. 14, 1936 |
| 2,099,764 | Touceda | Nov. 23, 1937 |
| 2,202,674 | Seaman et al. | May 28, 1940 |
| 2,214,274 | Glendenning | Sept. 10, 1940 |